(No Model.)
W. W. WILSON & H. J. VAN TUYL.
MILK COOLER.
No. 436,469. Patented Sept. 16, 1890.
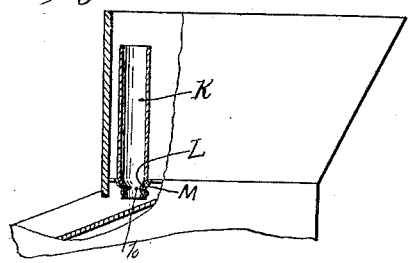
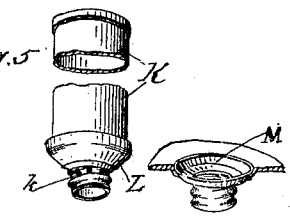
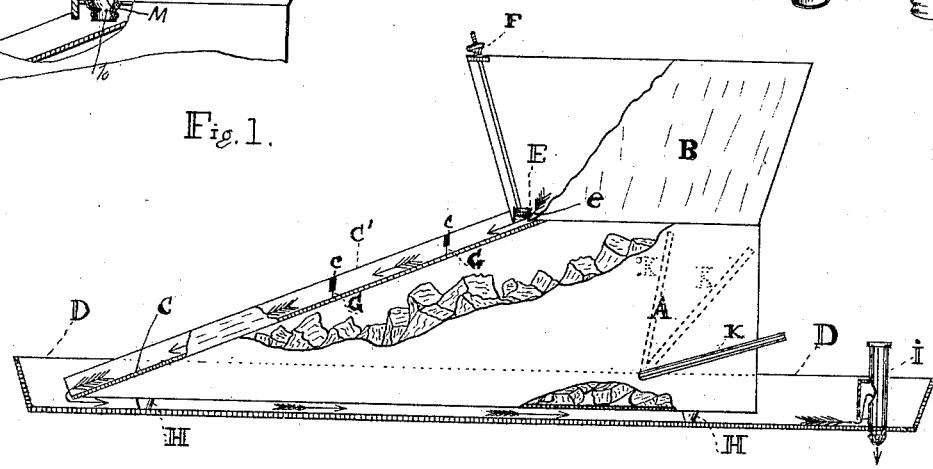
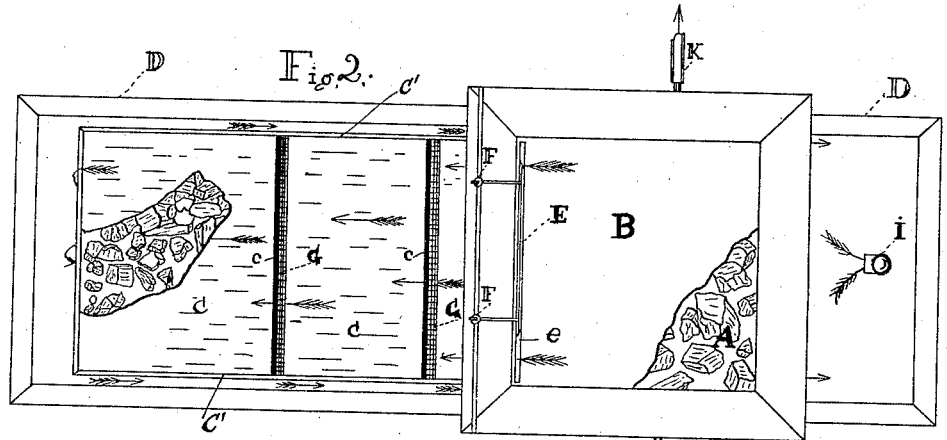
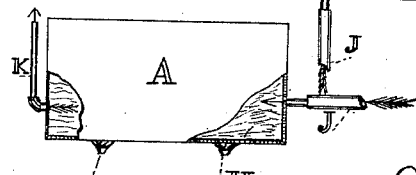
Witnesses:
Inventors:
William W. Wilson and
Henry J. Van Tuyl
by Church & Church
Their Attorneys.

UNITED STATES PATENT OFFICE.

WILLIAM W. WILSON AND HENRY J. VAN TUYL, OF HOMER, NEW YORK.

MILK-COOLER.

SPECIFICATION forming part of Letters Patent No. 436,469, dated September 16, 1890.

Application filed October 25, 1889. Serial No. 328,116. (No model.)

*To all whom it may concern:*

Be it known that we, WILLIAM W. WILSON and HENRY J. VAN TUYL, of Homer, in the county of Cortland and State of New York, have invented certain new and useful Improvements in Milk Coolers and Deodorizers; and we do hereby declare the following to be a full, clear, and exact description of the same, reference being had to the accompanying drawings, forming a part of this specification, and to the letters of reference marked thereon.

This invention relates to that class of dairy or creamery utensils employed to remove animal heat from the milk in order to facilitate the succeeding processes, and has for its object to provide an apparatus which will at once effectually cool and deodorize the milk and at the same time strain and clear the same of impurities.

A further object of the invention is to greatly reduce the cost and simplify the construction of such devices, whereby they are made practically automatic in operation, it only being necessary to keep the same supplied with a suitable cooling medium.

The invention consists in a vessel or chamber for the refrigerant located within a pan or receiver and having a long straight inclined surface down which the milk is permitted to flow through suitable spreaders and strainers into the receiver and from the latter into any suitable receptacle.

Further, the invention consists in certain novel details of construction and combinations and arrangements of parts, to be hereinafter described, and pointed out particularly in the claims at the end of this specification.

In the accompanying drawings, Figure 1 is a side elevation, partly in section, of a cooler constructed in accordance with our invention. Fig. 2 is a top plan view. Fig. 3 is a detail of the receptacle for the cooling medium. Figs. 4 and 5 are details of the preferred form of valve.

Like letters of reference indicate the same parts.

A indicates the receptacle or vessel for the refrigerant mounted on small legs or corrugations H and having a large part of the top in the form of an inclined surface C, with the side walls C' and cross-pieces c extending between the same.

Below the receptacle is arranged a receiver for the milk, preferably in the form of a pan D, in which the receptacle is placed, the legs H elevating the same slightly above the bottom, so as to leave a clear passage for the milk all around and enabling the receptacle to be readily lifted out for cleaning or filling. Devices for accomplishing the latter operation while the receptacle is in place are preferably employed, and such devices consist in the most desirable form of a tube or pipe J, located at about the line of the top of the receiver, through which cold water or other medium may be passed into the vessel, and a discharge tube or pipe K on the opposite side having its mouth just a little below the top of the receptacle, whereby the latter is kept almost full. This pipe K may, if desired, be connected to the vessel by a packed joint, whereby its discharge end may be lowered to regulate the height of the cooling medium or when ice is employed to drain the same, as shown in Fig. 1.

On top of the receptacle is located the tank B, in which the warm milk is placed and allowed to escape through the valve-orifice $e$ in the bottom, the quantity of milk flowing through the orifice being regulated by the valve E, controlled by the rod and thumb-nut F or by the valve to be presently described. This tank B may, if desired, serve as a top for the receptacle A, the orifice $e$ being located well to one side over the incline C.

Beneath the cross-pieces $c$ are arranged strainers G, through which the milk passes in moving down the incline, being thereby cleaned and distributed well over the surface of the incline, thus subjecting a very thin and evenly-distributed film of milk to the cooling effect of the refrigerant in the receptacle, which not only effectually cools but also removes any disagreeable smell or odor. After passing down the incline into the receiver, the milk flows under and around the bottom of the receptacle to the rear end of the receiver, whence it passes off through the overflow I, which is so constructed as to draw the the cooler milk from the bottom of the receiver. With this construction of device it will be seen that an almost constant flow of milk may be maintained, enabling a very large quantity to be cooled and deodorized at a minimum expense, as cold water derived from any source may be employed as the cooling medium, instead of ice or other more expensive refrigerants, the flow being constantly maintained through the receptacle.

The preferred form of valve (illustrated in Figs. 4 and 5) consists of a tube K, screw-threaded at the lower end and provided with perforations $k$ and a valve-seat L above the screw-threads, which co-operates with the valve-seat M, secured in the bottom of the tank. This construction, it will be seen, enables every part to be easily reached for cleaning, there being no corners for the lodgment of impurities, &c., and the valve-stem being removable and tubular may be washed without trouble.

The apparatus is simple and easily cleaned and filled, which feature will at once recommend it for use in the dairy where cleanliness is an absolute essential, and while the apparatus as described is in the preferred form it is obvious that many changes in detail and arrangements of the parts may be made without departing from the spirit of our invention.

Having thus described our invention, what we claim as new is—

1. In a milk cooler and deodorizer, the combination, with the receptacle for the refrigerant having the substantially straight incline and the tank at the upper end of the same, of the spreaders for the milk elevated slightly above the surface of the incline, whereby a thin film of milk is permitted to flow down the incline under the spreaders, substantially as described.

2. In a milk cooler and deodorizer, the combination, with the receptacle for the refrigerant having the flat substantially straight incline and the legs or corrugations, of the receiver in which said receptacle is placed with the discharge at the opposite end from the bottom of the incline, substantially as described.

3. In a milk cooler and deodorizer, the combination, with the receptacle for the refrigerant having the flat substantially straight incline, the tank at the top with the valved opening, the strainers, and spreaders above the strainers, of the receiver in which the receptacle is placed, the legs or corrugations for supporting the receptacle above the bottom, and the discharge at the opposite end from the bottom of the incline, substantially as described.

WILLIAM W. WILSON.
HENRY J. VAN TUYL.

Witnesses:
FRANK E. McCORMICK,
HILL DARROW.